United States Patent
Tau et al.

(10) Patent No.: US 11,254,848 B2
(45) Date of Patent: Feb. 22, 2022

(54) PROPYLENE/ETHYLENE COPOLYMER FILM FOR HEAT SEAL

(75) Inventors: Li-Min Tau, Lake Jackson, TX (US); Chai-Jing Chou, Sugar Land, TX (US); John Kaarto, Missouri City, TX (US); Peter S. Martin, Houston, TX (US); William G. Sheard, Missouri City, TX (US)

(73) Assignee: W.R. GRACE & CO.-CONN., Columbia, MD (US)

(*) Notice: Subject to any disclaimer, the term of this patent is extended or adjusted under 35 U.S.C. 154(b) by 0 days.

(21) Appl. No.: 14/122,736

(22) PCT Filed: Jul. 27, 2012

(86) PCT No.: PCT/US2012/048573
§ 371 (c)(1),
(2), (4) Date: Nov. 27, 2013

(87) PCT Pub. No.: WO2013/016647
PCT Pub. Date: Jan. 31, 2013

(65) Prior Publication Data
US 2014/0124405 A1   May 8, 2014

Related U.S. Application Data

(60) Provisional application No. 61/512,724, filed on Jul. 28, 2011.

(51) Int. Cl.
*B32B 27/08* (2006.01)
*B65D 25/14* (2006.01)
(Continued)

(52) U.S. Cl.
CPC ............ *C09K 3/1006* (2013.01); *B32B 27/08* (2013.01); *B65D 25/14* (2013.01); *C08F 210/06* (2013.01);
(Continued)

(58) Field of Classification Search
CPC ...... C09K 3/1006; B65D 25/14; B32B 27/08; C08F 210/06; C08F 210/02; C08F 210/16;
(Continued)

(56) References Cited

U.S. PATENT DOCUMENTS 6,365,689 B1 * 4/2002 Ushioda et al. .......... 526/160
2002/0115795 A1   8/2002 Shang et al.
(Continued)

FOREIGN PATENT DOCUMENTS

CN   1535294 A   10/2004
CN   1863830 A   11/2006
(Continued)

OTHER PUBLICATIONS

PCT/US2012/048573_International Search Report and Written Opinion of the International Searching Authority; International Search Report.
(Continued)

*Primary Examiner* — Lee E Sanderson
(74) *Attorney, Agent, or Firm* — Foley & Lardner LLP (57) ABSTRACT

The present disclosure provides compositions, films and articles containing a random propylene/ethylene copolymer and a substituted phenylene aromatic diester. Polymerization with an improved catalyst system increases the amount of ethylene incorporated into the random propylene/ethylene copolymer backbone which results in improved thermal properties, improved optical properties, and improved heat seal properties.

11 Claims, 4 Drawing Sheets

(51) Int. Cl.
*C09K 3/10* (2006.01)
*C08J 5/18* (2006.01)
*C08F 210/06* (2006.01)

(52) U.S. Cl.
CPC .............. *C08J 5/18* (2013.01); *C08J 2323/08* (2013.01); *Y10T 428/31938* (2015.04)

(58) Field of Classification Search
CPC ........ C08F 2410/06; C08F 4/64; C08F 10/06; C08J 5/18; C08J 2323/08; Y10T 428/31938; Y10T 428/3198; C08L 23/16; B01J 31/02
USPC ............ 206/524.3; 428/523; 526/348, 124.9; 525/247, 262, 323
See application file for complete search history.

(56) References Cited

U.S. PATENT DOCUMENTS

| | | |
|---|---|---|
| 2004/0210012 A1 | 10/2004 | Jaaskelainen et al. |
| 2005/0239636 A1 | 10/2005 | Gao et al. |
| 2006/0118237 A1 | 6/2006 | Miller et al. |
| 2006/0287446 A1 | 12/2006 | Gao et al. |
| 2007/0054997 A1 | 3/2007 | Pierini et al. |
| 2010/0197874 A1 | 8/2010 | Sheard et al. |

FOREIGN PATENT DOCUMENTS

| | | | |
|---|---|---|---|
| EA | 201000767 A1 | 12/2010 | |
| EP | 1002809 B1 | 5/2004 | |
| EP | 1580207 B1 * | 9/2006 | ............. C08F 10/00 |
| KR | 20040034617 A | 4/2004 | |
| KR | 20040091007 A | 10/2004 | |
| KR | 20070015600 A | 2/2007 | |
| WO | 9909079 A1 | 2/1999 | |
| WO | 2009087039 A1 | 7/2009 | |
| WO | 2010078480 A1 | 7/2010 | |
| WO | 2010078485 A1 | 7/2010 | |
| WO | WO 2010078479 A1 * | 7/2010 | ............. C08F 210/06 |

OTHER PUBLICATIONS

J. L. Koenig, "Spectroscopy of Polymers", 2nd Edition, Elsevier, 1999, pp. 14-20, New York, USA.

* cited by examiner

PROPYLENE/ETHYLENE COPOLYMER FILM FOR HEAT SEAL

BACKGROUND

The present disclosure provides compositions, films and articles containing a random propylene/ethylene copolymer.

Optics, toughness, stiffness and seal strength are important performance requirements for packaging. Current random propylene/ethylene copolymers deliver optimum properties at the expense of sacrificing other properties. In general, if one adds more ethylene in a random propylene/ethylene copolymer, the toughness and haze are improved with a reduction in stiffness and gloss. Also, too much ethylene can negatively affect seal parameters such as heat seal initiation temperature and/or hot tack initiation temperature. Conversely, when the ethylene content in the random propylene/ethylene copolymer resin is reduced, the stiffness improves while the toughness and optics are adversely impacted.

The art recognizes the need for a random propylene/ethylene copolymer with improved stiffness while simultaneously maintaining or improving toughness and/or optics. A need further exists for a random propylene/ethylene copolymer film with improved heat seal properties that does not sacrifice toughness and/or optics.

SUMMARY

The present disclosure provides a film. In an embodiment, the film includes a random propylene/ethylene copolymer. The random propylene/ethylene copolymer includes a substituted phenylene aromatic diester. The random propylene/ethylene copolymer has an ethylene incorporation index greater than 0.65 and a xylene solubles content according to the following equation:

$$\frac{\text{wt \% xylene solubles} - \text{wt \% total ethylene}}{\text{wt \% total ethylene}} < 0.8.$$

The present disclosure provides an article. In an embodiment, the article includes a heat seal. The heat seal has a first seal portion in contact with a second seal portion. The first seal portion and the second seal portion each is a component of a layer (such as a film or a layer of a film). The layer includes a random propylene/ethylene copolymer. The random propylene/ethylene copolymer includes a substituted phenylene aromatic diester. The first seal portion and the second seal portion may be a component of the same film. Alternatively, each seal portion is a component of a separate film.

The present disclosure provides a container. In an embodiment, the container includes a film composed of the random propylene/ethylene copolymer which contains the substituted phenylene aromatic diester. The container includes a heat seal. The heat seal seals a first film portion to a second film portion to define a container interior. The first film portion and the second film portion may be components of the same film. Alternatively, the first film portion and the second film portion each may be a component of separate films.

In an embodiment, a comestible is located in the container interior.

An advantage of the present disclosure is an improved random propylene/ethylene copolymer.

An advantage of the present disclosure is an improved film containing the present random propylene/ethylene copolymer.

An advantage of the present disclosure is an improved heat seal containing the present random propylene/ethylene copolymer.

An advantage of the present disclosure is the provision of a heat seal layer or film containing the present random propylene/ethylene copolymer having a lower heat seal initiation temperature and/or a lower hot tack initiation temperature when compared to a heat seal layer containing conventional propylene/ethylene copolymer.

An advantage of the present disclosure is the provision of a heat seal layer containing the present random propylene/ethylene copolymer and having improved heat seal properties.

An advantage of the present disclosure is the provision of random propylene/ethylene copolymer with a more effective incorporation of ethylene into the polymer backbone, corresponding to less xylene solubles, which leads to improved optical properties in films.

An advantage of the present disclosure is the provision of a film containing the present random propylene/ethylene copolymer having improved optics, toughness, and stiffness for molded articles made from the same.

An advantage of the present disclosure is the provision of an article containing a heat seal layer to form an improved pouch or bag for packaging food.

DETAILED DESCRIPTION

1. Polymeric Composition

The present disclosure provides a polymeric composition. In an embodiment, the polymeric composition includes (a)

a random propylene/ethylene copolymer having an ethylene incorporation index greater than 0.65 and (b) a substituted phenylene aromatic diester.

(a) Random Propylene/Ethylene Copolymer

The term "propylene/ethylene copolymer," as used herein, is a copolymer containing, in polymerized form, (i) a majority weight percent propylene monomer and (ii) ethylene monomer. A "random propylene/ethylene copolymer" is a polymer having individual repeating units of the ethylene monomer present in a random or statistical distribution in the polymer chain.

The term "random" is defined by "B-value" which is a measurement of the comonomer distribution across a polymer chain. The "Koenig B-value" calculates the distribution of ethylene units of a copolymer of propylene and ethylene, or a copolymer of propylene, ethylene and at least one unsaturated comonomer, across the polymer chain. Koenig B-values range from 0 to 2 with 1 designating a perfectly random distribution of comonomer units. The higher the Koenig B-value, the more alternating the comonomer distribution in the copolymer. The lower the Koenig B-value, the more blocky or clustered the commoner distribution in the copolymer. The present random propylene/ethylene copolymer has a B-value from 0.90, 0.93, or 0.95 to 0.96, 0.98, or 1.0.

The present random propylene/ethylene copolymer has an ethylene incorporation index greater than 0.65. The term "ethylene incorporation index," or "EII" as used herein, is the amount of ethylene (i.e., units derived from ethylene) present in the polymer backbone compared to the total ethylene present in the copolymer ("Et"). The EII is determined by way of the following equation:

$$EII = \frac{\text{Backbone ethylene of random propylene/ethylene copolymer (wt \%)}}{\text{Total ethylene } (Et) \text{ of random propylene/ethylene copolymer (wt \%)}}$$

The term "backbone ethylene" is the amount of ethylene in the xylene insoluble (XI) portion of the random propylene/ethylene copolymer. The weight percent of backbone ethylene is determined via $^{13}C$ NMR spectroscopy of the xylene insoluble portion of the random propylene/ethylene copolymer. Weight percent of the backbone ethylene is based on the total weight of the xylene insoluble portion.

In an embodiment, the EII is from 0.60, or 0.65, or 0.7 to 0.75, 0.80, or 0.85.

In an embodiment, the random propylene/ethylene copolymer contains from 3.2 wt % to 3.6 wt % units derived from ethylene and has an EII from 0.75 to 0.80.

The term "xylene soluble portion" (XS) is the fraction of the random propylene/ethylene copolymer that is soluble in xylene. "Xylene insoluble portion" (XI) is the fraction of the random propylene/ethylene copolymer that is insoluble in xylene.

The "total weight percent of ethylene" (or "Et") in the random propylene/ethylene copolymer, is the amount of ethylene in both the xylene soluble (XS) portion and in the xylene insoluble portion (XI) of the random propylene/ethylene copolymer. The total weight percent of ethylene is determined via $^{13}C$ NMR spectroscopy of the random propylene/ethylene copolymer. Weight percent of the total ethylene is based on the total weight of the random propylene/ethylene copolymer.

In an embodiment, the polymeric composition has an ethylene ratio greater than 2.0. The term "ethylene ratio," as used herein, compares the ethylene present in the xylene insoluble portion (XI) of the random propylene/ethylene copolymer to the ethylene present in the xylene soluble portion (XS) of the random propylene/ethylene copolymer. The ethylene ratio is determined as follows.

$$\text{Ethylene ratio} = \frac{\text{ethylene present in } XI \text{ (wt \%)}}{\text{ethylene present in } XS \text{ (wt \%)}}$$

Weight percent of XI ethylene is based on the total weight of the XI portion of the random propylene/ethylene copolymer. Weight percent of the XS ethylene is based on the total weight of the XS portion of the random propylene/ethylene copolymer. For XI ethylene and XS ethylene, the amount of ethylene is determined by way of $^{13}C$ NMR spectroscopy. The ethylene ratio is an indication of the effectiveness of ethylene insertion into the polypropylene backbone.

In an embodiment, the random propylene/ethylene copolymer has an ethylene ratio greater than 1.50, or greater than 2.0 to 4.0, or 3.8, or 3.5.

The xylene soluble portion of the random propylene/ethylene copolymer is from 1 wt %, or 2 wt %, or 4.0 wt % to 15 wt %. The XS portion is a function of ethylene content in the copolymer.

In an embodiment, the XS and the Et of the propylene/ethylene copolymer fulfill the following equation:

$$\frac{\text{wt \% } XS - \text{wt \% } Et}{\text{wt \% } Et} < 0.8 \, (\text{or} < 0.6, \text{ or} < 0.4, \text{ or} < 0.3)$$

(b) Substituted Phenylene Aromatic Diester

The present random propylene/ethylene copolymer contains a substituted phenylene aromatic diester. Applicant has discovered that catalyst composition with substituted phenylene aromatic diester as internal electron donor unexpectedly increases the EII by incorporating more ethylene into the backbone when compared to conventional catalyst systems.

The term "substituted phenylene aromatic diester," (or "SPAD") as used herein, may be a substituted 1,2-phenylene aromatic diester, a substituted 1,3 phenylene aromatic diester, or a substituted 1,4 phenylene aromatic diester.

In an embodiment, the substituted phenylene aromatic diester is a 1,2-phenylene aromatic diester with the structure (II) below:

(II)

wherein $R_1$-$R_{14}$ are the same or different. Each of $R_1$-$R_{14}$ is selected from a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one of $R_1$-$R_{14}$ is not hydrogen.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl-, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups IV, V, VI, and VII of the Periodic Table. Nonlimiting examples of heteroatoms include: halogens (F Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atom(s) may or may not be in the carbon chain.

In an embodiment, at least one (or two, or three, or four) R group(s) of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, the SPAD is 3-methyl-5-tert-butyl-1, 2-phenylene dibenzoate.

In an embodiment, the present polymeric composition has an MFR from 1 to 100.

Applicant has discovered that an ethylene incorporation index (EII) provides a more accurate metric for the thermal properties of random propylene/ethylene copolymers when compared to the total amount of ethylene present in the copolymer (Et). As shown in the Examples section, Applicant has found a direct correlation between EII and the thermal properties of random propylene/ethylene copolymer. This correlation to thermal properties does not necessarily apply when measuring total ethylene content (Et). In other words, although Et may be the same for two copolymers the thermal properties of the two copolymers may be quite different.

In this way, Applicant has created an improved method for characterizing thermal, optical and heat seal properties for random propylene/ethylene copolymer. EII, is particularly advantageous when assessing the properties of heat seals of films/layers made from random propylene copolymer—properties such as heat seal strength, heat seal initiation temperature, hot tack strength, and/or hot tack initiation temperature.

2. Film

The present disclosure provides a film. In an embodiment, a film is provided and includes (a) a random propylene/ethylene copolymer containing substituted phenylene aromatic diester and having an ethylene incorporation index greater than 0.65, (b) a xylene solubles content less than 5.0 wt %.

The term "film" is a sheet, laminate, web or the like or combinations thereof, having length and breadth dimensions and having two major surfaces with a thickness there between. A film can be a monolayer film (having only one layer) or a multilayer film (having two or more layers). In an embodiment, the film is a monolayer film with a thickness from 0.5 mil, or 0.8 mil, or 1 mil to about 10 mils.

The term "multilayer film" is a film having two or more layers. Layers of a multilayer film are bonded together by one or more of the following nonlimiting methods: coextrusion, extrusion coating, vapor deposition coating, solvent coating, emulsion coating, or suspension coating. In an embodiment, the multilayer film has a thickness from 1.0 mil to 2 mils, or 3 mils, or up to 10 mils.

The film may be an extruded film. The terms "extrusion," and "extrude," is/are a process for forming continuous shapes by forcing a molten plastic material through a die, optionally followed by cooling or chemical hardening. Immediately prior to extrusion through the die, the relatively high-viscosity polymeric material is fed into a rotating screw, which forces it through the die. The extruder can be a single screw extruder, a multiple screw extruder, a disk extruder or a ram extruder. The die can be a film die, blown film die, sheet die, pipe die, tubing die or profile extrusion die. Nonlimiting examples of extruded articles include pipe, film, and/or fibers.

The film may be a coextruded film. The terms "coextrusion," and "coextrude," is/are a process for extruding two or more materials through a single die with two or more orifices arranged so that the extrudates merge or otherwise weld together into a laminar structure. Coextrusion may be employed as an aspect of other processes, for instance, in film blowing, casting film, and extrusion coating processes.

The film may be a blown film. The terms "blown film" or "film blowing" is/are a process for making a film in which a polymer or copolymer is extruded to form a bubble filled with air or another gas in order to stretch the polymeric film. Then, the bubble is collapsed and collected in flat film form.

In an embodiment, the film is a monolayer injection molded film and has a thickness of 20 mil and a haze value less than about 6.5%.

In an embodiment, the film is a monolayer injection molded film and has a thickness of 80 mil and a haze value less than about 20%.

In an embodiment, the film is a monolayer injection molded film and has a thickness of 120 mil and a haze value less than about 36%.

3. Article

The present disclosure provides an article. In an embodiment, an article is provided and includes a heat seal including a first seal portion in contact with a second seal portion. The first seal portion and the second seal portion each are a component of a layer. The layer includes the present random propylene/ethylene copolymer which contains the substituted phenylene aromatic diester.

In an embodiment, the propylene/ethylene copolymer has an ethylene incorporation index greater than 0.65, and a xylene solubles content less than 5.0 wt %.

In an embodiment, the layer is a component of a film, or is otherwise a film.

The term "heat seal" is the union of two layers (or the union of two films, or the union of two film portions) brought into contact with each other and application of heat and/or pressure to cause the contacting surfaces to become molten and intermix with one another, thereby forming adhesion between the two layers. The heat seal is created by heating (for example, by using a heated bar, hot wire, hot air, infrared radiation, or ultrasonic sealing) the layers (or surfaces thereof) to at least their respective softening points.

Figure 1A:
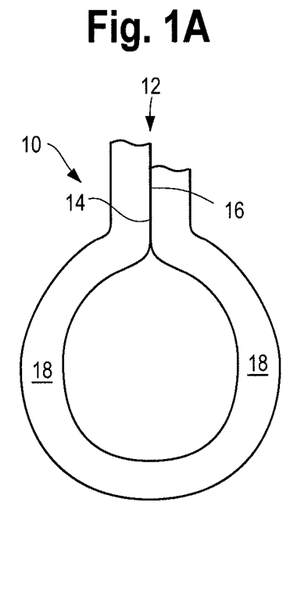
FIG. 1A is a schematic representation of an article in accordance with an embodiment of the present disclosure.

FIG. 1A illustrates an embodiment of the present disclosure in which a film of the polymeric composition is formed into an article 10. Article 10 includes a heat seal 12 having a first seal portion 14 in contact with a second seal portion 16. Each of the first and second seal portions 14, 16 are components of a layer 18. In FIG. 1A the first seal portion 14 and the second seal portion 16 are components of the same layer, layer 18, thus forming the article 10 into a pouch or bag. In an embodiment, the first seal portion 14 and the second seal portion 16 each is a component of a single film.

Figure 1B:
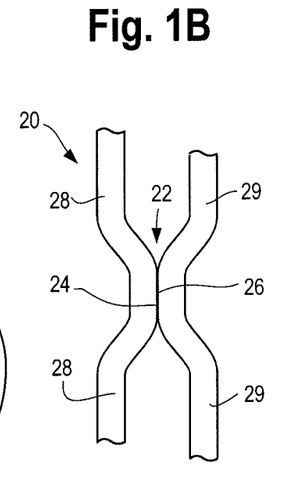
FIG. 1B is a schematic representation of an article in accordance with an embodiment of the present disclosure.

FIG. 1B illustrates an embodiment of the present disclosure in which the polymeric composition is formed into an article 20. Article 20 includes a heat seal 22 having a first seal portion 24 in contact with a second seal portion 26. The first seal portion 24 is a component of a layer 28 and the second seal portion 26 is a component of a layer 29. Each of the first seal portion 24 and the second seal portion contains the present random propylene/ethylene copolymer (with SPAD). In FIG. 1B the first seal portion 24 and the second seal portion 26 are components of different layers. In a further embodiment, the first seal portion 24 is a component of a first film and the second seal portion 26 is a component of a second film.

Figure 1C:
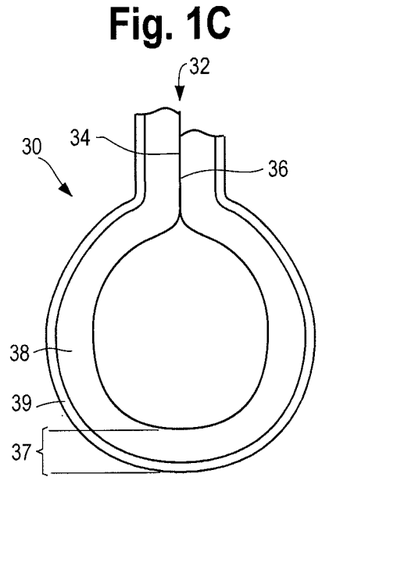
FIG. 1C is a schematic representation of an article in accordance with an embodiment of the present disclosure.

FIG. 1C illustrates an embodiment of the present disclosure in which the polymeric composition is formed into an article 30. Article 30 includes a multilayer film 37 having a first layer 38 and a second layer 39. The first layer 38 includes a heat seal 32 having a first seal portion 34 in contact with a second seal portion 36. Each of the first seal portion 34 and the second seal portion 36 contains the present random propylene/ethylene copolymer. The second layer 39 is coextensive, or substantially coextensive, with the first layer 38. First seal portion 34 and second seal portion 36 may be components of the same film or layer. Alternatively, first seal portion 34 and second seal portion 36 are components of different films.

In an embodiment, heat seal 12, and/or heat seal 22, and/or heat seal 32 is a permanent heat seal.

In an embodiment, heat seal 12, and/or heat seal 22, and/or heat seal 32 is a releasable seal, such as a peel seal.

The appropriate application for the article having a heat seal is dependent on the amount of ethylene content. The article may be used in bags for food packaging, such as snack food and/or chips. The articles with the heat seal may be used to contain flowable materials such as liquids for example milk, water, fruit juice, emulsions for example ice cream mix, pastes for example peanut butter, preservers, jams, jellies, doughs, ground meat, powders, nuts, sugar, and the like.

In an embodiment, the article is a molded article. The molded article may be an extruded article, an injection molded article, a blow molded article, a rotation molded article, and a thermoformed article. "Molding" is a process by which a polymer is melted and led into a mold, which is the inverse of the desired shape, to form parts of the desired shape and size. Molding can be pressure-less or pressure-assisted.

"Injection molding" is a process by which a polymer is melted and injected at high pressure into a mold, which is the inverse of the desired shape, to form parts of the desired shape and size. The mold can be made from metal, such as steel and aluminum. "Rotational molding" is a process used for producing hollow plastic products. Rotational molding differs from other processing methods in that the heating, melting, shaping, and cooling stages all occur after the polymer is placed in the mold, therefore no external pressure is applied during forming.

"Blow molding" is a process for making hollow plastic containers. Blow molding includes placing a softened polymer in the center of a mold, inflating the polymer against the mold walls with a blow pin, and solidifying the product by cooling. There are three general types of blow molding; extrusion blow molding, injection blow molding, and stretch blow molding. Injection blow molding can be used to process polymers that cannot be extruded. Stretch blow molding can be used for difficult to blow crystalline and crystallizable polymers such as polypropylene.

In an embodiment, the article is a biaxially-oriented film.

In an embodiment, the article is a container. The container includes a film. The film is composed of the present random propylene/ethylene copolymer and the substituted phenylene aromatic diester. A heat seal seals or otherwise joins a first film portion to a second film portion to define a container interior (and also defines a container exterior). The heat seal can be any heat seal configuration as disclosed above. The container heat seal can be a permanent heat seal or a releasable heat seal (i.e., a peel seal). Nonlimiting examples of suitable containers include flexible packaging and rigid packaging.

In an embodiment, the heat seal is a partial heat seal to form an open container.

In an embodiment, the heat seal is a full heat seal, completely enclosing the container interior from the external environment.

In an embodiment, the first film portion and the second film portion each are a component of a single film. In other words, a single film is folded over upon itself, the heat seal formed around the film periphery to form a flexible container.

In an embodiment, the first film portion is a component of a first film. The second film portion is a component of a second film. The first film and the second film are mated in a mirror-image manner and aligned so to form a common film periphery. The heat seal is formed around the film periphery to form a flexible container and define the container interior.

In an embodiment, a comestible is located in the container interior. A "comestible," as used herein, is an edible object such as food or a beverage. It is understood that an "edible" object is a composition that is suitable for consumption by a human, mammal, bird, and/or fish and is non-toxic. In an embodiment, the comestible is a material that complies with applicable standards such as food, drug, cosmetic (FD&C) regulations in the United States and/or Eurocontrol experimental center (E.E.C.) standards in the European Union. Nonlimiting examples of suitable comestibles include confectionery materials, pasta, snack foods, extruded snacks such as crackers and snack chips, marshmallows, pastries, pet (dog, cat, bird, fish) food, cereals, sausage, and cheese.

Nonlimiting examples of suitable containers include flexible bags for comestibles such as snack food bags, potato chip bags, retort pouches for ready-to-eat-food, overwrap for cigarettes, water pouches, small flexible pouches for shampoo, small soy sauce bags, cheese overwrap, bakery bags, and confectionary/candy bags.

Test Methods $^{13}$C NMR characterization (ethylene content, Koenig B-value, triad distribution, triad tacticity, number average sequence length for ethylene and propylene (i.e., le and lp respectively) is performed as follows:

Sample Preparation

The samples are prepared by adding approximately 2.7 g of a 50/50 mixture of tetrachloroethane-d$_2$/orthodichlorobenzene containing 0.025 M Cr(AcAc)$_3$ to 0.20 g sample in a Norell 1001-7 10 mm NMR tube. The samples are dissolved and homogenized by heating the tube and its contents to 150° C. using a heating block and heat gun. Each sample is visually inspected to ensure homogeneity.

Data Acquisition Parameters

The data are collected using a Bruker 400 MHz spectrometer equipped with a Bruker Dual DUL high-temperature CryoProbe. The data are acquired using 1280 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for 7 minutes prior to data acquisition Differential Scanning calorimetry (DSC) is used to determine the melting point (Tm), the crystallization temperature (Tc) and the heat of fusion (ΔHf). In this method, the sample is heated quickly and then held at 220° C. for a period of 5 minutes to ensure that all crystallites have melted. The sample is then cooled at 10° C./min from 220° C. to 0° C., and held at 0° C. for 5 minutes. Subsequently, the sample is reheated at 10° C./min from 0° C. to 220° C.

Gel Permeation Chromatography (GPC) Analytical Method for Polypropylene. The polymers are analyzed on a PL-220 series high temperature gel permeation chromatography (GPC) unit equipped with a refractometer detector and four PLgel Mixed-A (20 µm) columns (Polymer Laboratory Inc.). The oven temperature is set at 150° C. and the temperatures of autosampler's hot and the warm zones are at 135° C. and 130° C. respectively. The solvent is nitrogen purged 1,2,4-trichlorobenzene (TCB) containing ~200 ppm 2,6-di-t-butyl-4-methylphenol (BHT). The flow rate is 1.0 mL/min and the injection volume was 200 µl. A 2 mg/mL sample concentration is prepared by dissolving the sample in N$_2$ purged and preheated TCB (containing 200 ppm BHT) for 2.5 hrs at 160° C. with gentle agitation.

The GPC column set is calibrated by running twenty narrow molecular weight distribution polystyrene standards. The molecular weight (MW) of the standards ranges from 580 to 8,400,000 g/mol, and the standards were contained in 6 "cocktail" mixtures. Each standard mixture has at least a decade of separation between individual molecular weights. The polystyrene standards are prepared at 0.005 g in 20 mL of solvent for molecular weights equal to or greater than 1,000,000 g/mol and 0.001 g in 20 mL of solvent for molecular weights less than 1,000,000 g/mol. The polystyrene standards are dissolved at 150° C. for 30 min under stirring. The narrow standards mixtures are run first and in order of decreasing highest molecular weight component to minimize degradation effect. A logarithmic molecular weight calibration is generated using a forth-order polynomial fit as a function of elution volume. The equivalent polypropylene molecular weights are calculated by using following equation with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{PP} = \left( \frac{K_{PS} M_{PS}^{a_{PS}+1}}{K_{PP}} \right)^{\frac{1}{a_{PP}+1}}$$

where $M_{PP}$ is PP equivalent MW, $M_{PS}$ is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

Haze and Clarity are measured in accordance with ASTM D 1003.

"Heat seal strength" is a measurement of the force (in pounds-force) required to separate a seal after the material has cooled to 23° C.

The term "heat seal initiation temperature" ("HSIT") is defined as the first temperature above ambient at which a seal can be formed by applying a given pressure to a given thickness of film for a given length of time.

The term "hot tack initiation temperature" ("HTIT") is the temperature at which the hot-tack strength is 4 Newtons/inch, or 4 N/in. Often the initiation temperature is expressed as the minimum temperature at which 2 mil film forms a seal with a strength of 0.5N/in using ASTM F 1921, Method B. In general lower initiation temperatures are desirable because less energy is required to form the seal and also the less time it takes for the initial seal to form at a given seal jaw temperature. Thus production rates are capable of being increased.

"Hot tack strength" is the measurement of the force (in Newtons) required to separate a heat seal before the seal has had a chance to fully cool (crystallize).

Melt flow rate (MFR) is measured in accordance with ASTM D 1238 test method at 230° C. with a 2.16 kg weight for propylene-based polymers.

Xylene soluble portion is determined by a method adapted from ASTM D5492-06. The procedure consists of weighing 2 g of sample and dissolving it in 200 ml o-xylene in a 400 ml flask with 24/40 joint. The flask is connected to a water cooled condenser and the contents are stirred and heated to reflux under N$_2$, and then maintained at reflux for an additional 30 minutes. The solution is then cooled in a temperature controlled water bath at 25° C. for a minimum of 45 minutes to allow the crystallization of the xylene insoluble fraction. Once the solution is cooled and the insoluble fraction precipitates from the solution, the separation of the xylene soluble portion (XS) from the xylene insoluble portion (XI) is achieved by filtering through 25 micron filter paper. One hundred ml of the filtrate is collected into a pre-weighed aluminum pan, and the o-xylene is evaporated from this 100 ml of filtrate under a nitrogen stream. Once the solvent is evaporated, the pan and contents are placed in a 100° C. vacuum oven for 30 minutes or until dry. The pan is then allowed to cool to room temperature and weighed. Xylene soluble portion is calculated as XS (wt %)=$[(m_3-m_2)*2/m_1]*100$, where $m_1$ is the original weight of the sample used, $m_2$ is the weight of empty aluminum pan, and $m_3$ is the weight of the pan and residue.

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the percent compositions.

"Composition," and like terms are a mixture or blend of two or more components. In the context of a mix or blend of materials from which a cable sheath or other article of manufacture is fabricated, the composition includes all the components of the mix, e.g., polypropylene, polyethylene co-polymer, metal hydrate and any other additives such as cure catalysts, antioxidants, flame retardants, etc.

"Comprising", "including", "having" and like terms are not intended to exclude the presence of any additional component, step or procedure, whether or not the same is specifically disclosed. In order to avoid any doubt, all processes claimed through use of the term "comprising" may include one or more additional steps, pieces of equipment or component parts, and/or materials unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or," unless stated otherwise, refers to the listed members individually as well as in any combination.

"Interpolymer" is a polymer prepared by the polymerization of at least two different types of monomers. This generic term includes copolymers, which are polymers prepared from two different types of monomers, and polymers prepared from more than two different types of monomers, e.g., terpolymers, tetrapolymers, etc.

The "Koenig B-value" is a measurement of the comonomer distribution across a polymer chain. The "Koenig B-Value" calculates the distribution of the ethylene units of a copolymer of propylene and ethylene, or a copolymer of propylene, ethylene and at least one unsaturated comonomer, across the polymer chain. Koenig B-values range from 0 to 2 with 1 designating a perfectly random distribution of comonomer units. The higher the Koenig B-value, the more alternating the comonomer distribution in the copolymer. The lower the Koenig B-value, the more blocky or clustered the comonomer distribution in the copolymer.

The Koenig B-Value is determined according to the method of J. L. Koenig (Spectroscopy of Polymers, $2^{nd}$ Edition, Elsevier, 1999). B is defined for a propylene/ethylene copolymer as:

$$B = \frac{f(EP + PE)}{2 \cdot F_E \cdot F_P}$$

where f(EP+PE)=the sum of the EP and PE diad fractions; FE and FP=the mole fraction of ethylene and propylene in the copolymer, respectively. The diad fraction can be derived from triad data according to: f(EP+PE)=[EPE]+[EPP+PPE]/2+[PEP]+[EEP+PEE]/2. The Koenig B-values can be calculated for other copolymers in an analogous manner by assignment of the respective copolymer diads. For example, calculation of the B-value for propylene/1-octene copolymer uses the following equation:

$$B = \frac{f(OP + PO)}{2 \cdot F_O \cdot F_P}$$

"Polymer" is a polymeric compound prepared by polymerizing monomers, whether of the same or a different type. The generic term polymer thus embraces the term homopolymer, which is a polymer prepared from only one type of monomer, and the term interpolymer as defined below.

"Polyolefin", "PO" and like terms are a polymer derived from simple olefins. Many polyolefins are thermoplastic and for purposes of this disclosure, can include a rubber phase. Representative polyolefins include polyethylene, polypropylene, polybutene, polyisoprene and their various interpolymers.

The term "propylene/ethylene copolymer," as used herein, is a copolymer that comprises a majority weight percent polymerized propylene monomer (based on the total amount of the polymerizable monomers), a minority weight percent of polymerized ethylene monomer. Ethylene is considered an alpha-olefin.

EXAMPLES

1. Comparative Samples 1-6

Each of comparative samples 1-6 is a random propylene/ethylene copolymer made from SHAC™ 205, a magnesium-containing catalyst with di-isobutyl phthalate as internal electron donor, available commercially from The Dow Chemical Company.

Polymerization is performed in a gas phase fluidized bed polymerization reactor (14-inch reactor diameter). The cocatalyst is triethylaluminum, the external electron donor is dicyclopentyldimethoxysilane (DCPDMS), n-propyltrimethoxysilane (NPTMS), or n-propyltriethoxysilane (PTES), and the activity limiting agent is isopropyl myristate (IPM).

The Comparative Samples (CS) 1-6 are further characterized below in Table 1.

TABLE 1

Properties of Comparative Samples 1-6

| Comparative samples | Col 1<br>% of Xylene Solubles in the whole Resin, wt % | Col 2<br>wt % ethylene in the whole resin, wt % | Col 3<br>Ethylene content in the XS fraction, wt % | Col 4<br>Ethylene content in the XI-PP-backbone, wt % | Col 5<br>Ethylene Incorporation Index (EII) | Col 6<br>Ethylene Ratio (ER) |
|---|---|---|---|---|---|---|
| 1 | 10.80 | 5.55 | 1.94 | 3.61 | 0.65 | 1.86 |
| 2 | 13.97 | 6.62 | 2.65 | 3.97 | 0.60 | 1.50 |
| 3 | 17.68 | 7.16 | 3.54 | 3.62 | 0.51 | 1.02 |
| 4 | 16.51 | 7.11 | 3.30 | 3.81 | 0.54 | 1.15 |
| 5 | 16.51 | 7.47 | 3.47 | 4.00 | 0.54 | 1.15 |
| 6 | 11.00 | 5.70 | 1.98 | 3.72 | 0.65 | 1.88 |

Figure 2:
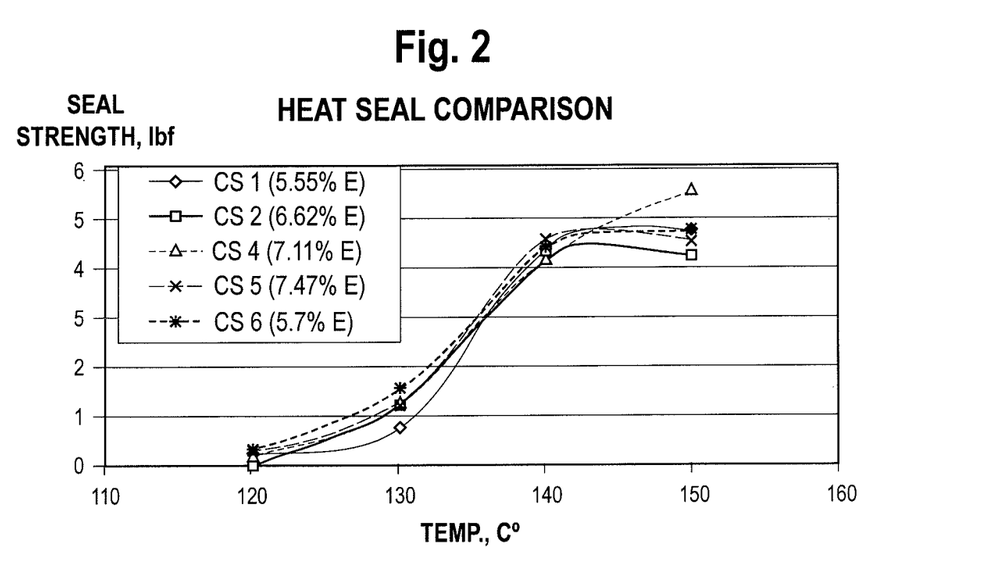
FIG. 2 is a graph showing the heat seal strength versus temperature in accordance with an embodiment of the present disclosure.

FIG. 2 compares the heat seal behaviors for the polymers for CS1-CS6. Table 1 and FIG. 2 show that increasing ethylene comonomer using conventional catalyst does not improve heat seal strength. In FIG. 2, CS5, with 7.47 wt % ethylene, shows no improvement to heat seal strength when compared to CS1, with 5.5 wt % ethylene. All other factors being equal, FIG. 2 shows that an increase in wt % ethylene in the propylene/ethylene copolymer does not correlate to an increase in heat seal strength.

2. Example 1 and Comparative Sample 7

A. Example 1

Synthesis of Procatalyst Composition with SPAD

At ambient temperature, 351 g of a mixed magnesium/titanium halide alcoholate is agitated in a mixture of 1.69 kg of chlorobenzene and 4.88 kg of titanium(IV) chloride. After 10 minutes, 750 mL of a chlorobenzene solution containing 164.5 g of 5-tert-butyl-3-methyl-1,2-phenylene dibenzoate is added, followed by an additional 0.46 kg of chlorobenzene. The mixture is agitated at 100° C. for 60 minutes, allowed to settle, then filtered at 100° C. The solids are agitated in 3.16 kg of chlorobenzene at 70° C. for 15 minutes, allowed to settle, then filtered at 70° C. The solids are agitated in a mixture of 2.36 kg of chlorobenzene and 4.84 kg of titanium(IV) chloride, and after 10 minutes, a solution of 109.7 g of 5-tert-butyl-3-methyl-1,2-phenylene dibenzoate in 416 g of chlorobenzene is added, followed by an additional 0.20 kg of chlorobenzene. The mixture is agitated at 105-110° C. for 30 minutes, allowed to settle, then filtered at 105-110° C. The solids are agitated in a mixture of 3.10 kg of chlorobenzene and 4.84 kg of titanium (IV) chloride at 105-110° C. for 30 minutes, allowed to settle, then filtered at 105-110° C. After cooling, the solids are washed twice with 3.47 kg of hexane at 45° C., followed by a final wash with 3.47 kg of 2-methylbutane at ambient temperature. The solids are subjected to vacuum to remove residual volatiles, then combined with 683 g of mineral to generate a slurry.

B. Comparative Sample 7

The procatalyst composition for CS7 is SHAC™ 205, a magnesium-containing catalyst with di-isobutyl phthalate as internal electron donor, available commercially from The Dow Chemical Company.

C. Polymerization

Polymerization is performed in a gas phase fluidized bed polymerization reactor (14-inch reactor diameter).

For Example 1, the procatalyst composition is the SPAD-containing procatalyst composition from 2(A) above, the cocatalyst is triethylaluminum, the external electron donor is dicyclopentyldimethoxysilane (DCPDMS), and the activity limiting agent is isopropyl myristate (IPM).

For Comparative Sample 7, the procatalyst composition is SHAC™ 205, the cocatalyst is triethylaluminum, the external electron donor is n-propyltrimethoxysilane (NPTMS), and the activity limiting agent is isopropyl myristate.

Table 2 below compares an the propylene/ethylene copolymer of Example 1 with the propylene/ethylene copolymer of CS7.

TABLE 2

Property Comparison between Example 1 and Comparative Sample 7

|  | Example 1 | Comparative Sample 7 |
|---|---|---|
| Starting MFR | 5.6 | 3.6 |
| Final MFR | 7.9 | 8.3 |
| Total ethylene, Et, (wt %) | 3.4 | 3.4 |
| xylene solubles (XS) in resin (wt %) | 4.7 | 8.2 |
| ethylene in xylene solubles fraction ($E_{XS}$*) (wt %) | 15.1 | 17.4 |
| ethylene in xylene insolubles fraction (wt %) | 2.9 | 2.3 |
| XS × $E_{XS}$ (wt %) | 0.71 | 1.43 |
| Et − (XS × $E_{XS}$) (wt %) | 2.69 | 1.97 |
| % mm in the whole resin | 98.1 | 95.5 |
| B-value in the whole resin, % | 96 | 89 |
| Lp for the whole resin | 20.7 | 22.3 |
| B-value in the XS fraction % | 92 | 85 |
| Lp for the XS fraction | 5.1 | 4.9 |
| EII | 0.79 | 0.58 |
| ER | 3.79 | 1.38 |

TABLE 2-continued

Property Comparison between Example 1 and Comparative Sample 7

| | Example 1 | Comparative Sample 7 |
|---|---|---|
| Injection Molded Properties: | | |
| 1% SFM, Ksi | 151.6 | 137.7 |
| RT. Gardner, in-lbf | 263.5 | 246 |

*$E_{XS}$ = ethylene content is XS (wt %, based on total wt XS)

Example 1 contains 3.4% total ethylene content (Et) and 4.7% XS. Comparative Sample 7 contains 3.4% total ethylene content and 8.2% XS.

Figure 3:
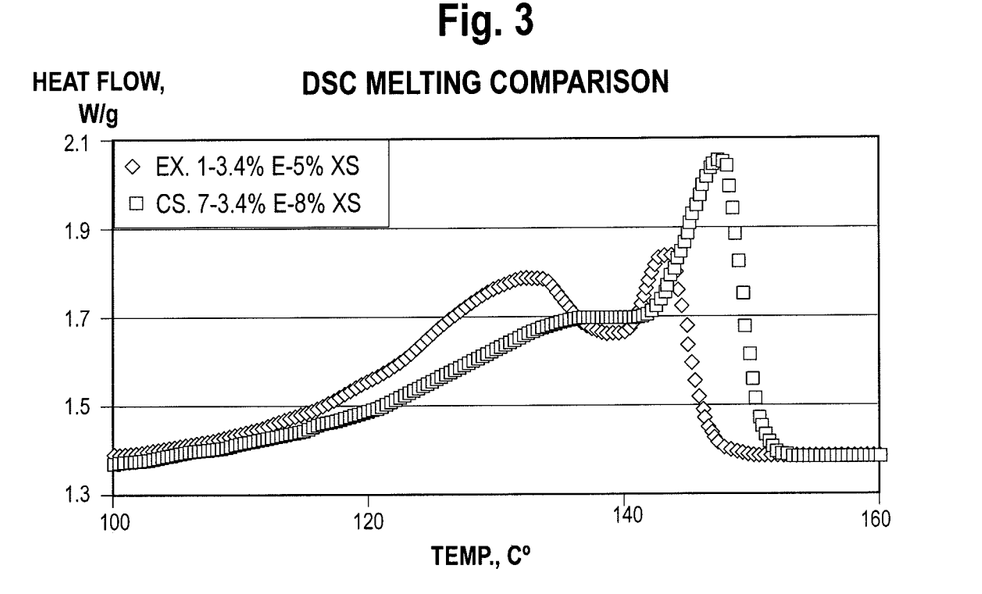
FIG. 3 is a graph showing a DSC melting profile for a random propylene/ethylene copolymer in accordance with an embodiment of the present disclosure.
Figure 4:
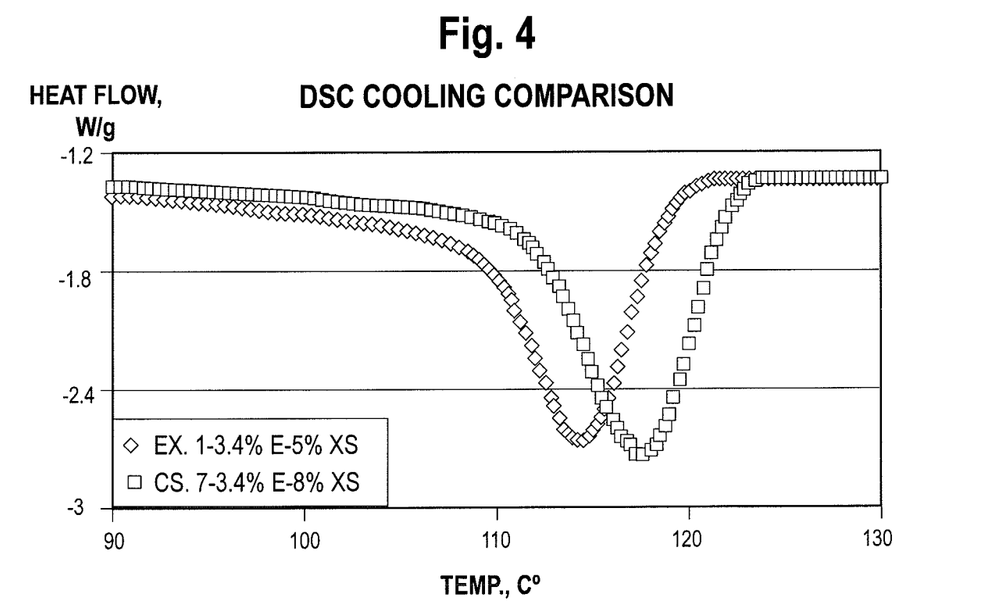
FIG. 4 is a graph showing a DSC cooling profile for a random propylene/ethylene copolymer in accordance with an embodiment of the present disclosure.

FIG. 3 displays the DSC Melting Comparison between Example 1 and Comparative Sample 7. FIG. 4 displays the DSC Cooling Comparison between Example 1 and Comparative Sample 7. Heat flow in FIGS. 3-4 is measured in Watts (joules/second) per gram (W/g).

Example 1 and CS7 have the same total ethylene content Et, namely 3.4 wt % total ethylene content. However, Example 1 has a lower melting temperature and a lower crystallization temperature when compared to CS7. FIG. 3 and FIG. 4 show that although both Example 1 and Comparative Sample 7 have the same total ethylene content, due to the effective ethylene insertion in the polymer backbone in Example 1, Example 1 has a lower melting temperature and a lower crystallization temperature than that of Comparative Sample 7. In addition, the height of the melting peak for Example 1 has less intensity when compared to the height of the melting peak for CS7, demonstrating that the ethylene is more evenly distributed in Example 1 than is the ethylene in CS7.

FIGS. 3 and 4 show that Example 1 contains more backbone ethylene than does CS7—even though Example 1 and CS7 have the same total ethylene content. FIGS. 3 and 4 are consistent with the data in Table 2. Table 2 shows Example 1 with a greater EII (0.79) than CS7 (EII 0.58). Example 1 has a greater ethylene ratio (3.79) than CS7 (1.38).

D. Optics

Figure 5:
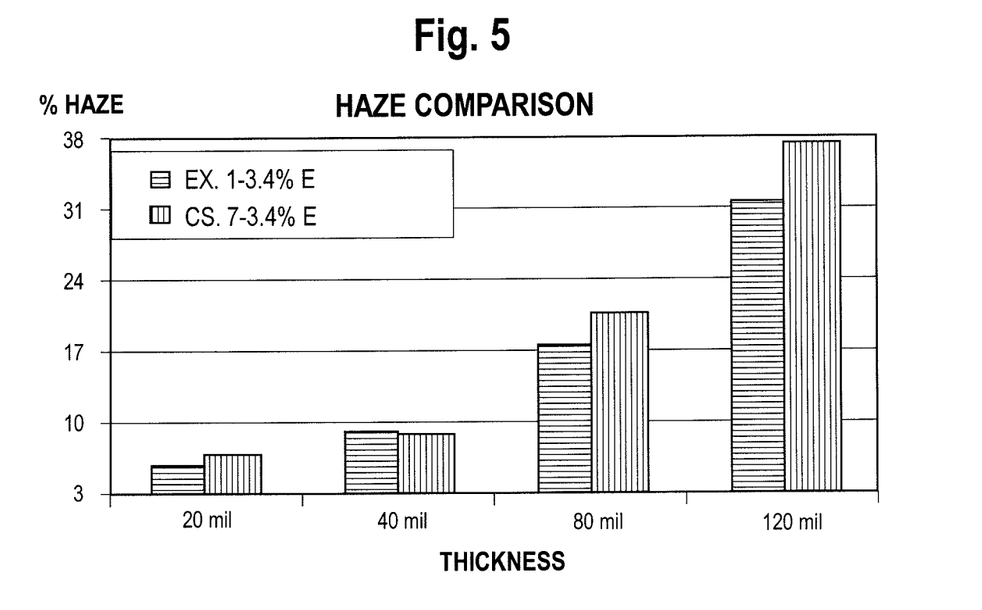
FIG. 5 is a graph showing haze values for films in accordance with an embodiment of the present disclosure.

FIG. 5 compares haze values of Example 1 and CS7. Haze is measured in accordance with ASTM D 1003. Clarity is measured in accordance with ASTM D 1746. Example 1 has lower haze value compared to CS7.

Figure 6A:
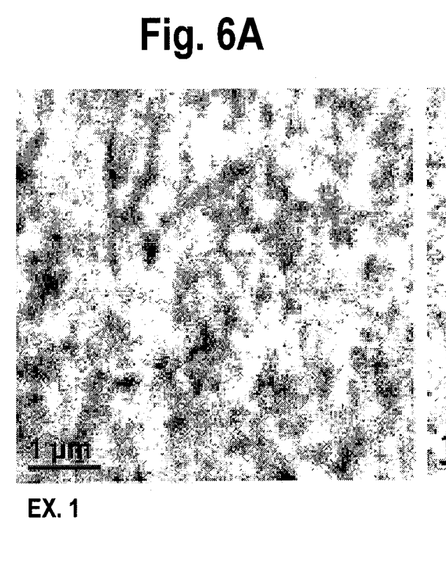
FIG. 6A is a Transmission Electron Microscopy (TEM) image of a random propylene/ethylene copolymer in accordance with an embodiment of the present disclosure.
Figure 6B:
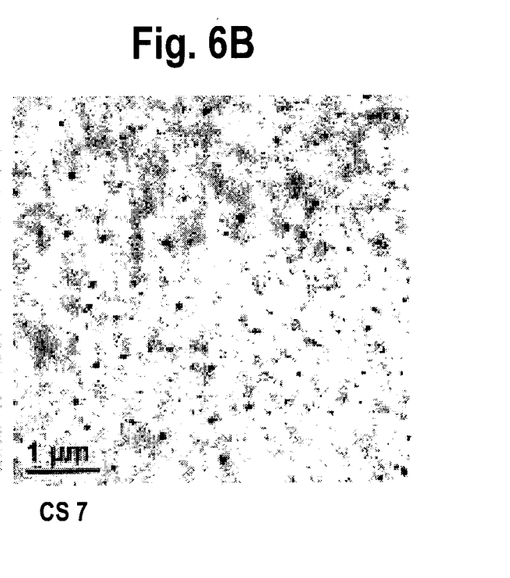
FIG. 6B is a TEM image of a comparative sample of random propylene/ethylene copolymer.

FIG. 6A is the TEM image of Example 1. FIG. 6B is a TEM image of Comparative Sample 7. FIG. 6B demonstrates the distinct domains in the Comparative Sample 7 which interfere with light and lead to higher haze values. FIG. 6A (Example 1) does not have these distinct domains, leading to lower haze values for Example 1.

TABLE 3

Optical Properties for Example 1 and Comparative Sample 7

| | Film Thickness (mil) | Example 1 | Comparative Sample 7 |
|---|---|---|---|
| Clarity (%) | 20 | 99.5 | 99.4 |
| Clarity (%) | 40 | 99.6 | 99.6 |
| Clarity (%) | 80 | 99.5 | 99.4 |
| Clarity (%) | 120 | 98.2 | 96.1 |
| Haze (%) | 20 | 6 | 6.7 |
| Haze (%) | 40 | 9.1 | 8.9 |

TABLE 3-continued

Optical Properties for Example 1 and Comparative Sample 7

| | Film Thickness (mil) | Example 1 | Comparative Sample 7 |
|---|---|---|---|
| Haze (%) | 80 | 17.3 | 20.5 |
| Haze (%) | 120 | 31.3 | 37.1 |

TABLE 4

Optical Properties for Example 1 and CS7

| | Example 1 | CS7 |
|---|---|---|
| Coextruded Film | Homopolymer Polypropylene | Homopolymer Polypropylene |
| Clarity, % | 96.9 | 95.86 |
| 45-Gloss, % | 73.14 | 70.14 |
| Haze, % | 2.842 | 3.526 |

The 45-gloss measured in accordance with ASTM D 2457. Example 1 made with the SPAD-containing catalyst has lower haze and greater clarity and higher gloss when compared to CS7, made with conventional catalyst.

E. Heat Seal Properties

Figure 7:
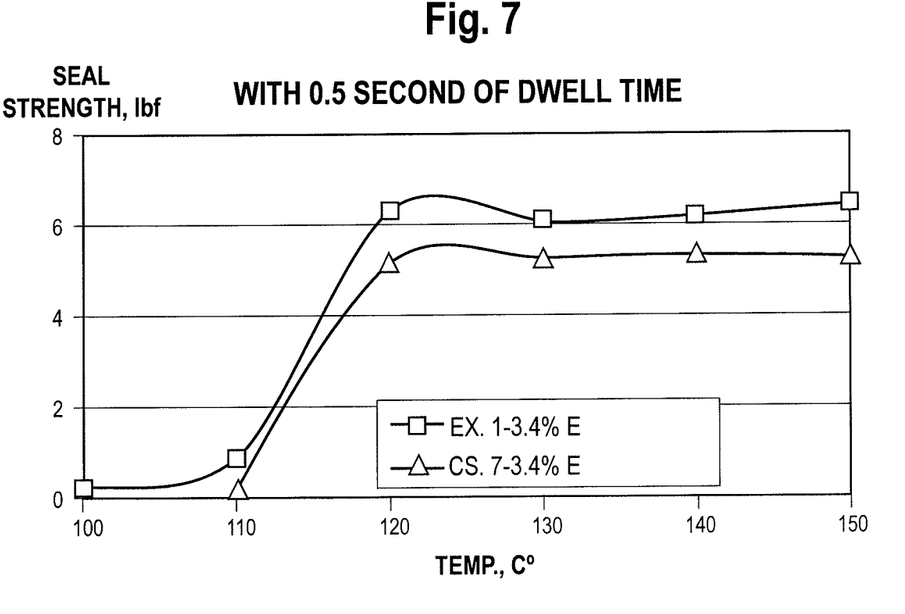
FIG. 7 is a graph showing seal strength versus temperature in accordance with an embodiment of the present disclosure.
Figure 8:
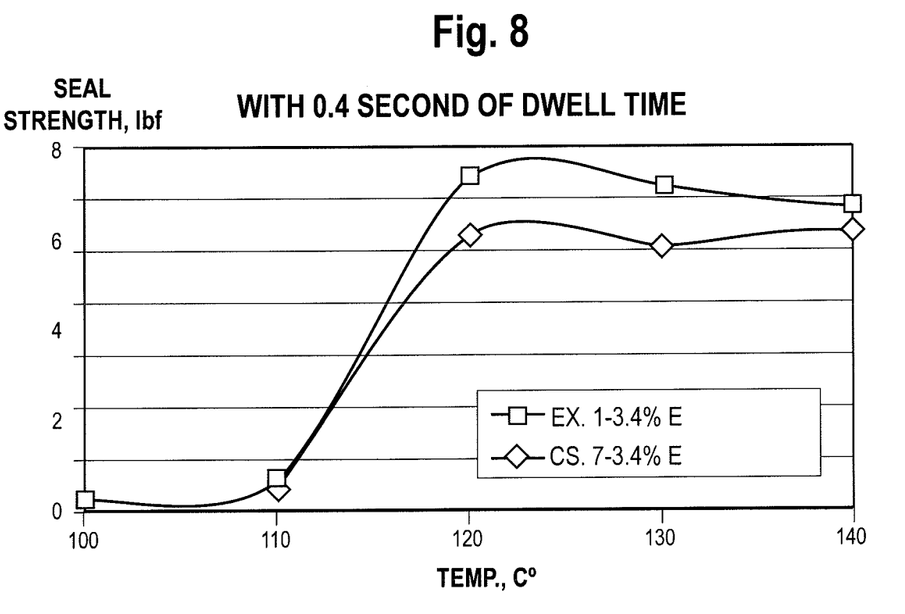
FIG. 8 is a graph showing seal strength versus temperature in accordance with an embodiment of the present disclosure.

FIGS. 7-8 demonstrate that films made with the present random propylene/ethylene copolymer (Example 1) have better heat seal properties compared to conventional propylene/ethylene copolymer. Example 1 provides a stronger seal strength at the same dwell time compared to CS7 (FIGS. 7-8). Example 1 has a lower heat seal initiation temperature than CS7. Example 1 has a higher maximum seal strength than Comparative Sample 7.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:
1. A film comprising:
   a catalytically polymerized random propylene/ethylene copolymer the catalyst comprising a substituted 1,2-phenylene aromatic diester internal electron donor having the structure (II)

(II)

wherein $R_1$-$R_{14}$ are the same or different and each of $R_1$-$R_{14}$ is selected from the group consisting of hydrogen, substituted hydrocarbyl group having 1 to 20 carbon atoms, unsubstituted hydrocarbyl group having 1 to 20 carbon atoms, alkoxy group having 1 to 20 carbon atoms, a heteroatom, and combinations thereof, wherein at least one of $R_1$-$R_{14}$ is not hydrogen;

the random propylene/ethylene copolymer having:
(A) an ethylene incorporation index from greater than 0.65 to 0.85; and
(B) a xylene solubles content and total ethylene content according to the following equation $$\frac{\text{wt \% xylene solubles} - \text{wt \% total ethylene}}{\text{wt \% total ethylene}} < 0.8;$$

and
(C) a Koenig B-value from 0.90 to 1.0; and
wherein the random propylene/ethylene copolymer has an ethylene ratio from greater than 2.0 up to 4.0, wherein the ethylene ratio is defined as follows:
ethylene ratio=[ethylene present in XI (wt %)]/[ethylene present in XS (wt %)];
wherein XI is the xylene insoluble portion of said copolymer and XS is the xylene soluble portion of said copolymer.

2. The film of claim 1 wherein the substituted phenylene aromatic diester is 3-methyl-5-tert-butyl-1,2-phenylene dibenzoate.

3. An article comprising:
a heat seal comprising a first seal portion in contact with a second seal portion, the first seal portion and the second seal portion each being a component of a layer,
wherein the layer comprises a catalytically polymerized random propylene/ethylene copolymer comprising a substituted 1,2-phenylene aromatic diester internal electron donor having the structure (II)

(II)

wherein $R_1$-$R_{14}$ are the same or different and each of $R_1$-$R_{14}$ is selected from the group consisting of hydrogen, substituted hydrocarbyl group having 1 to 20 carbon atoms, unsubstituted hydrocarbyl group having 1 to 20 carbon atoms, alkoxy group having 1 to 20 carbon atoms, a heteroatom, and combinations thereof, wherein at least one of $R_1$-$R_{14}$ is not hydrogen;

the random propylene/ethylene copolymer having:
(A) an ethylene incorporation index from greater than 0.65 to 0.85; and
(B) a xylene solubles content and total ethylene content according to the following equation $$\frac{\text{wt \% xylene solubles} - \text{wt \% total ethylene}}{\text{wt \% total ethylene}} < 0.8;$$

(C) a Koenig B-value from 0.90 to 1.0; and
wherein the random propylene/ethylene copolymer has an ethylene ratio from greater than 2.0 up to 4.0, wherein the ethylene ratio is defined as follows:
ethylene ratio=[ethylene present in XI (wt %)]/[ethylene present in XS (wt %)];
wherein XI is the xylene insoluble portion of said copolymer and XS is the xylene soluble portion of said copolymer.

4. The article of claim 3 wherein each of the first seal portion and the second seal portion is a component of a single film.

5. The article of claim 3 wherein the first seal portion is a component of a first film and the second seal portion is a component of a second film.

6. The article of claim 3 wherein the layer is a biaxially oriented film.

7. The article of claim 3 wherein the layer is a seal layer of a multilayer film.

8. A container comprising:
a film comprising a catalytically polymerized random propylene/ethylene copolymer, the catalyst comprising a substituted 1,2-phenylene aromatic diester internal electron donor having the structure (II);

(II)

wherein $R_1$-$R_{14}$ are the same or different and each of $R_1$-$R_{14}$ is selected from the group consisting of hydrogen, substituted hydrocarbyl group having 1 to 20 carbon atoms, unsubstituted hydrocarbyl group having 1 to 20 carbon atoms, alkoxy group having 1 to 20 carbon atoms, a heteroatom, and combinations thereof, wherein at least one of $R_1$-$R_{14}$ is not hydrogen;

the random propylene/ethylene copolymer having:
(A) an ethylene incorporation index from greater than 0.65 to 0.85; and
(B) a xylene solubles content and total ethylene content according to the following equation $$\frac{\text{wt \% xylene solubles} - \text{wt \% total ethylene}}{\text{wt \% total ethylene}} < 0.8;$$

(C) a Koenig B-value from 0.90 to 1.0;
wherein the random propylene/ethylene copolymer has an ethylene ratio from greater than 2.0 up to 4.0, wherein the ethylene ratio is defined as follows:

ethylene ratio=[ethylene present in XI (wt %)]/[ethylene present in XS (wt %)]; and wherein XI is the xylene insoluble portion of said copolymer and XS is the xylene soluble portion of said copolymer and a heat seal sealing a first film portion to a second film portion and defining a container interior.

9. The container of claim 8 wherein the first film portion and the second film portion each are a component of a single film.

10. The container of claim 8 where the first film portion is a component of a first film and the second film portion is a component of a second film.

11. The container of claim 8 comprising a comestible located in the container interior.

* * * * *